US010358923B2

(12) United States Patent
Takata

(10) Patent No.: US 10,358,923 B2
(45) Date of Patent: Jul. 23, 2019

(54) COOLING DEVICE, GAS TURBINE INSTALLATION PROVIDED WITH SAME, AND METHOD FOR OPERATING COOLING DEVICE

(71) Applicant: MITSUBISHI HITACHI POWER SYSTEMS, LTD., Kanagawa (JP)

(72) Inventor: Kazumasa Takata, Yokohama (JP)

(73) Assignee: MITSUBISHI HITACHI POWER SYSTEMS, LTD., Kanagawa (JP)

(*) Notice: Subject to any disclaimer, the term of this patent is extended or adjusted under 35 U.S.C. 154(b) by 333 days.

(21) Appl. No.: 15/304,963

(22) PCT Filed: May 20, 2015

(86) PCT No.: PCT/JP2015/064461
§ 371 (c)(1),
(2) Date: Oct. 18, 2016

(87) PCT Pub. No.: WO2015/178418
PCT Pub. Date: Nov. 26, 2015

(65) Prior Publication Data
US 2017/0138201 A1 May 18, 2017

(30) Foreign Application Priority Data
May 22, 2014 (JP) ................. 2014-106265

(51) Int. Cl.
F01D 1/00 (2006.01)
F01D 5/08 (2006.01)
(Continued)

(52) U.S. Cl.
CPC ............ F01D 5/085 (2013.01); F01D 5/081 (2013.01); F01D 9/023 (2013.01); F01D 25/12 (2013.01);
(Continued)

(58) Field of Classification Search
CPC .......... F01D 5/085; F01D 5/081; F01D 5/082; F01D 9/023; F01D 25/12; F02C 7/18;
(Continued)

(56) References Cited

U.S. PATENT DOCUMENTS

2010/0154434 A1* 6/2010 Kubota .................... F02C 7/18
60/785
2011/0138818 A1* 6/2011 Mizukami .............. F01D 11/24
60/778

FOREIGN PATENT DOCUMENTS

| JP | 11-050809 | 2/1999 |
| JP | 2010-090819 | 4/2010 |
| JP | 2012-077660 | 4/2012 |

OTHER PUBLICATIONS

International Search Report dated Aug. 18, 2015 in International Application No. PCT/JP2015/064461 (with English translation).
(Continued)

Primary Examiner — Craig Kim
Assistant Examiner — Edwin Kang
(74) Attorney, Agent, or Firm — Wenderoth, Lind & Ponack, L.L.P.

(57) ABSTRACT

A cooling device includes a hot-part cooling system configured to guide air to a hot part of a gas turbine. The hot-part cooling system includes a compressor capable of operating independently of the gas turbine, and is configured to extract air inside a casing of the gas turbine to pressurize the air with the compressor and guide the air to the hot part of the gas turbine. The cooling device further includes a rotor cooling system configured to extract the air inside the casing of the gas turbine and guide the air to a turbine rotor, and a connecting system configured to guide the air pressurized by the compressor to the rotor cooling system while a fuel supply to the gas turbine is stopped.

13 Claims, 9 Drawing Sheets

(51) Int. Cl.
    *F01D 25/12*    (2006.01)
    *F01D 9/02*    (2006.01)
    *F02C 7/18*    (2006.01)
    *F02C 7/32*    (2006.01)
    *F02C 9/18*    (2006.01)
    *F02C 9/28*    (2006.01)
    *F02C 9/52*    (2006.01)
    *F23M 5/08*    (2006.01)
    *F23R 3/00*    (2006.01)
    *F23R 3/26*    (2006.01)

(52) U.S. Cl.
CPC ................ *F02C 7/18* (2013.01); *F02C 7/185* (2013.01); *F02C 7/32* (2013.01); *F02C 9/18* (2013.01); *F02C 9/28* (2013.01); *F02C 9/52* (2013.01); *F23M 5/085* (2013.01); *F23R 3/002* (2013.01); *F23R 3/005* (2013.01); *F23R 3/26* (2013.01); *F05D 2220/32* (2013.01); *F05D 2240/24* (2013.01); *F05D 2240/301* (2013.01); *F05D 2260/232* (2013.01); *F05D 2260/85* (2013.01); *Y02T 50/676* (2013.01)

(58) Field of Classification Search
CPC .. F02C 7/185; F02C 7/141; F02C 9/18; F02C 9/52; F02C 6/08; F05D 2260/85; F23R 3/002; F23R 2900/03043
See application file for complete search history.

(56) References Cited

OTHER PUBLICATIONS

Written Opinion of the International Searching Authority dated Aug. 18, 2015 in International Application No. PCT/JP2015/064461 (with English translation).

\* cited by examiner

COOLING DEVICE, GAS TURBINE INSTALLATION PROVIDED WITH SAME, AND METHOD FOR OPERATING COOLING DEVICE

CROSS-REFERENCE TO RELATED APPLICATION

This application claims priority based on Japanese Patent Application No. 2014-106265 filed on May 22, 2014, the contents of which are incorporated herein by reference.

TECHNICAL FIELD

The present invention relates to a cooling device of a gas turbine, a gas turbine installation provided with the cooling device, and a method for operating the cooling device.

BACKGROUND ART

A gas turbine includes a compressor that compresses atmospheric aft to generate compressed air, a combustor that combusts fuel in the compressed aft to generate combustion gas, and a turbine that is driven by the combustion gas. The compressor includes a compressor rotor that rotates about an axis and a compressor casing that covers the compressor rotor while allowing the compressor rotor to rotate. The turbine includes a turbine rotor that rotates about an axis and a turbine casing that covers the turbine rotor while allowing the turbine rotor to rotate.

A predetermined clearance (hereinafter, this clearance will be referred to as a tip clearance) is required between the outer end, in the radial direction, of a blade of the turbine rotor and the inner peripheral surface of the turbine casing. In terms of the turbine efficiency, it is desirable to minimize the tip clearance as much as possible.

Incidentally, after the gas turbine is stopped, the temperature of the turbine rotor disposed inside the turbine casing drops more slowly than that of the turbine easing, which is exposed to the outside air. Therefore, after the gas turbine is stopped, an amount of decrease in thermal expansion, per unit time, of the turbine rotor is less than an amount of decrease in thermal expansion, per unit time, of the turbine casing. Thus, after the gas turbine is stopped, the tip clearance is temporarily decreased. When the gas turbine is started in this state, the position of the outer end, in the radial direction, of the blade is displaced toward the outer side in the radial direction due to a centrifugal force acting on the turbine rotor, which in turn may cause the blade of the turbine rotor to come into contact with the inner peripheral surface of the turbine casing.

Hence, in the technology disclosed in Japanese Unexamined Patent Application Publication No. H11-050809A, at the startup of the gas turbine, the turbine rotor is cooled by pressurizing air extracted from a gas turbine casing using a blower and supplying the air into the turbine rotor. In the technology disclosed in Japanese Unexamined Patent Application Publication No. H11-050809A, cooling the turbine rotor in the above-described manner to increase the tip clearance at the startup of the gas turbine prevents the blade of the turbine rotor from coming into contact with the inner peripheral surface of the turbine casing.

Technical Problem

In the technology disclosed in Japanese Unexamined Patent Application Publication No. H11-050809A, although the turbine rotor is cooled at the startup of the gas turbine, a time difference arises between when the cooling is started and when the tip clearance is increased, which may cause tip contact.

SUMMARY OF THE INVENTION

In light of the foregoing, an object of the present invention is to provide a technology capable of securing a tip clearance at the startup of a gas turbine.

Solution to Problem

A cooling device according to an aspect of the invention to solve the above-described problem includes: a hot-part cooling system that includes a compressor capable of operating independently of a gas turbine, the hot-part cooling system being configured to extract air inside a casing of the gas turbine from the casing, to pressurize the air with the compressor and guide the air to a hot part that constitutes a part of the gas turbine and comes into contact with combustion gas; a rotor cooling system configured to extract the air inside the casing from the casing and guide the air to a rotor of the gas turbine; and a connecting system configured to guide the air pressurized by the compressor to the rotor cooling system while a fuel supply to the gas turbine is stopped.

During the fuel supply to the gas turbine, the cooling device can cause the hot-part cooling system to cool the hot part with the air extracted from the interior of the casing. Further, during the fuel supply to the gas turbine, the cooling device can cause the rotor cooling system to cool the rotor with the air extracted from the interior of the casing. Furthermore, even while the fuel supply to the gas turbine is stopped, the cooling device can supply the air pressurized by the compressor of the hot-part cooling system to the rotor via the connecting system and the rotor cooling system. Thus, the cooling device can cool the rotor even while the fuel supply to the gas turbine is stopped.

Here, in the cooling device, the hot-part cooling system may include a hot-part cooling line that is provided with the compressor and that extracts the air inside the casing from the casing and guides the air to the hot part. The connecting system may include: a connecting line that is connected to the hot-part cooling line at a position closer to the hot part than a position at which the compressor is provided and that guides the air pressurized by the compressor to the rotor cooling system a connection control valve provided in the connecting line; and a control device that closes the connection control valve during the fuel supply to the gas turbine and opens the connection control valve while the fuel supply is stopped.

In the cooling device, since the connection control valve is closed during the fuel supply to the gas turbine, the air pressurized by the compressor of the hot-part cooling system does not flow into the connecting line, and flows entirely into the hot-part cooling line. Thus, during the fuel supply to the gas turbine, the cooling device can efficiently supply the air pressurized by the compressor of the hot-part cooling system to the hot part.

Further, in the cooling device including the control device, the hot-part cooling system may include a hot-part cooling control valve provided in the hot-part cooling line at a position closer to the hot part than a position at which the connecting line is connected to the hot-part cooling line. The control device may open the hot-part cooling control valve during the fuel supply to the gas turbine and may close the hot-part cooling control valve while the fuel supply is stopped.

In the cooling device, since the hot-part cooling control valve is closed while the fuel supply to the gas turbine is stopped, the air pressurized by the compressor of the hot-part cooling system does not flow toward the hot-part side of the hot part cooling line, and flows entirely into the connecting line. Thus, while the fuel supply to the gas turbine is stopped, the cooling device can efficiently supply the air pressurized by the compressor of the hot-part cooling system to the rotor cooling system via the connecting system.

In any one of the above-described cooling devices including the control device, the rotor cooling system may include: a rotor cooling line that extracts the air inside the casing from the casing and guides the air to the rotor of the gas turbine, and a rotor cooling control valve provided in the rotor cooling line. The connecting line may be connected to the rotor cooling line at a position closer to the rotor than a position at which the rotor cooling control valve is provided. The control device may open the rotor cooling control valve during the fuel supply to the gas turbine and may close the rotor cooling control valve while the fuel supply is stopped.

In the cooling device, while the filet supply to the gas turbine is stopped, the air pressurized by the compressor of the hot-part cooling system flows into the rotor cooling line through the connecting line. In the cooling device, since the rotor cooling control valve, which is provided in the rotor cooling line at a position closer to the casing than a position at which the rotor cooling line is connected to the connecting line, is closed while the fuel supply to the gas turbine is stopped, the air that flows into the rotor cooling line from the connecting line does not flow toward the casing, but flows entirely toward the rotor. Thus, while the fuel supply to the gas turbine is stopped, the cooling device can efficiently supply the air pressurized by the compressor of the hot-part cooling system to the rotor.

In any one of the above-described cooling devices including the control device, the control device may cause the compressor to be driven at least temporarily during a necessary cooling period, which starts when the fuel supply to the gas turbine is stopped and ends at a predetermined time. When the fuel supply to the gas turbine is not resumed during the necessary cooling period, the control device may cause the compressor to stop after the necessary cooling period elapses.

In the cooling device, since the driving time of the compressor can be limited, energy consumption for driving the compressor can be suppressed.

In any one of the above-described cooling devices including the control device, the hot-pan cooling system may include: an air intake line that is connected to the hot-part cooling line at a position closer to the casing than the position at which the compressor is provided and that takes in atmospheric air; a filter that removes foreign substances from the atmospheric air passing through the air intake line; and an air intake control valve provided in the air intake line at a position closer to a connection position of the air intake line with the hot-part cooling line than the filter. The control device may close the air intake control valve during the fuel supply to the gas turbine and may open the air intake control valve while the fuel supply is stopped.

In the cooling device, while the fuel supply to the gas turbine is stopped, the atmospheric air, which has a temperature lower than that of the air inside the casing, can be taken into the hot-part cooling system, and after the air is pressurized by the compressor, the air can be supplied to the rotor. Thus, the cooling device can efficiently cool the rotor while the fuel supply to the gas turbine is stopped.

A gas turbine installation according to an aspect of the invention to solve the above-described problem includes any one of the above-described cooling devices, and the gas turbine.

A method for operating a cooling device according to an aspect of the invention to solve the above-described problem is a method for operating a cooling device including: a hot-part cooling system that includes a compressor capable of operating independently of a gas turbine and that extracts air inside a casing of the gas turbine from the casing to pressurize the air with the compressor and guides the air to a hot part that constitutes a part of the gas turbine and comes into contact with combustion gas; and a rotor cooling system that extracts the air inside the casing from the casing and guides the air to a rotor of the gas turbine. The method for operating the cooling device includes: a hot-part cooling step of cooling the hot part by driving the compressor during a fuel supply to the gas turbine and supplying air from the hot-part cooling system to the hot part; a first rotor cooling step of cooling the rotor by supplying air from the rotor cooling system to the rotor during the fuel supply to the gas turbine; and a second rotor cooling step of cooling the rotor by driving the compressor while the fuel supply to the gas turbine is stopped and supplying air pressurized by the compressor to the rotor via the rotor cooling system.

In the operating method, during the fuel supply to the gas turbine, the hot part can be cooled by the hot-part cooling system, with the air extracted from the interior of the casing. Further, in the operating method, during the fuel supply to the gas turbine, the rotor can be cooled with the air extracted from the interior of the easing as a result of the rotor cooling system performing the first rotor cooling step. Furthermore, in the operating method, even while the fuel supply to the gas turbine is stopped, the air pressurized by the compressor of the hot-part cooling system can be supplied to the rotor via the rotor cooling system by performing the second rotor cooling step. Thus, in the operating method, even while the fuel supply to the gas turbine is stopped, the rotor can be cooled.

Here, in the method for operating the cooling device, in the second rotor cooling step, the air pressurized by the compressor may be promoted to flow into the rotor cooling system, and the air pressurized by the compressor may be inhibited from flowing into the hot part.

Further, in any one of the above-described methods for operating the cooling device, in the second rotor cooling step, the air pressurized by the compressor and flowing into the rotor cooling system may be inhibited from flowing toward the casing in the rotor cooling system and may be promoted to flow toward the rotor in the rotor cooling system.

Further, in any one of the above-described methods for operating the cooling device, in the hot-part cooling step, the air pressurized by the compressor may be inhibited from flowing into the rotor cooling system, and the air pressurized by the compressor may be promoted to flow into the hot part.

Further, in any one of the above-described methods for operating the cooling device, the second rotor cooling step may be performed by driving the compressor at least temporarily during a necessary cooling period, which starts when the fuel supply to the gas turbine is stopped and ends at a predetermined time. When the fuel supply to the gas turbine is resumed during the necessary cooling period, the hot-part cooling step and the first rotor cooling step may be performed alter the second rotor cooling step is terminated.

When the fuel supply to the gas turbine is not resumed during the necessary cooling period, the second rotor cooling step may be terminated by stopping the compressor after the necessary cooling period elapses.

In any one of the above-described methods for operating the cooling device, in the second rotor cooling step, atmospheric air may be taken into the hot-part cooling system by the compressor, and the atmospheric air may be supplied to the rotor via the rotor cooling system.

Advantageous Effects of Invention

According to one aspect of the present invention, a tip clearance can be secured at the startup of a gas turbine.

DESCRIPTION OF THE EMBODIMENTS

An embodiment of a gas turbine installation according to the present invention and modified examples of the embodiment will be described below in detail with reference to the drawings.

Embodiment

An embodiment of a gas turbine installation according to the present invention will be described below with reference to FIGS. 1 to 7.

Figure 1:
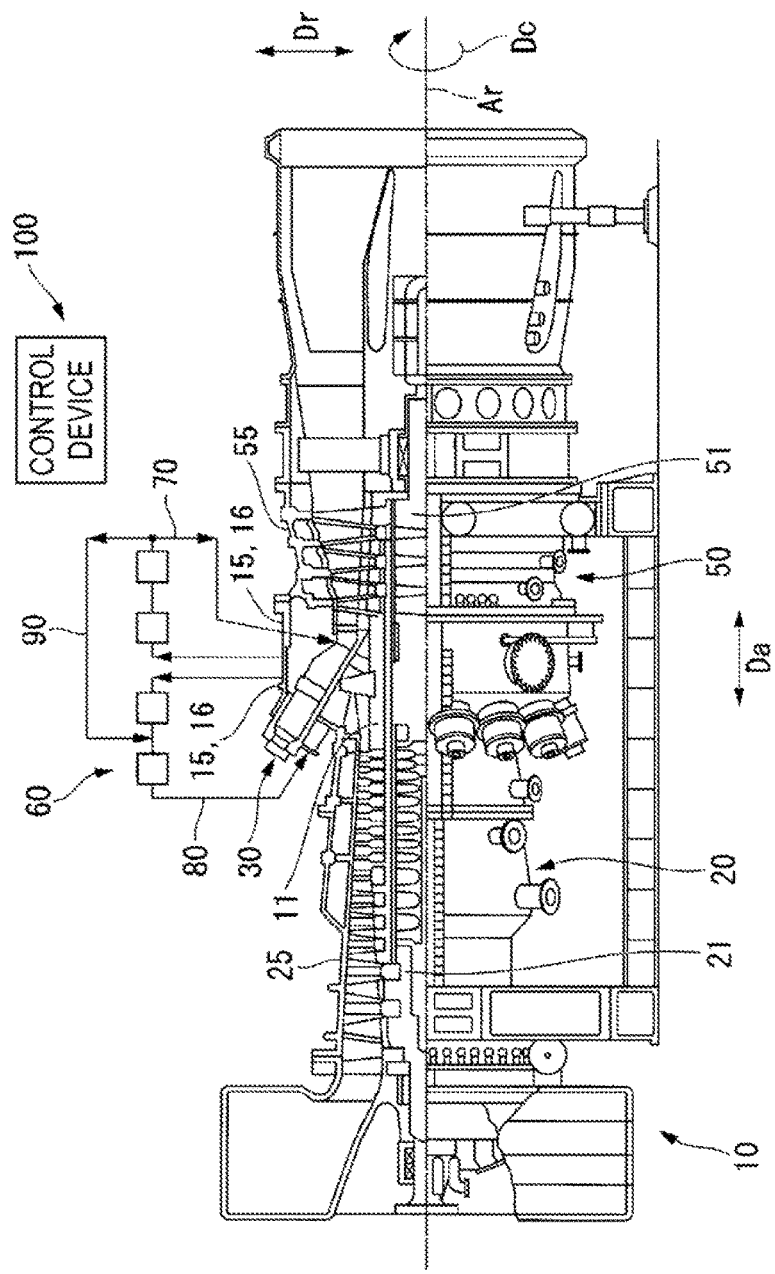
FIG. 1 is an overall cutaway side view of main portions of a gas turbine of an embodiment according to the present invention.

As illustrated in FIG. 1, the gas turbine installation of the present embodiment includes a gas turbine 10, and a cooling device 60 that cools some component parts of the gas turbine 10.

The gas turbine 10 includes a compressor 20 that compresses air, a combustor 30 that combusts fuel in the air compressed by the compressor 20 to generate combustion gas, and a turbine 50 that is driven by the combustion gas.

Figure 2:
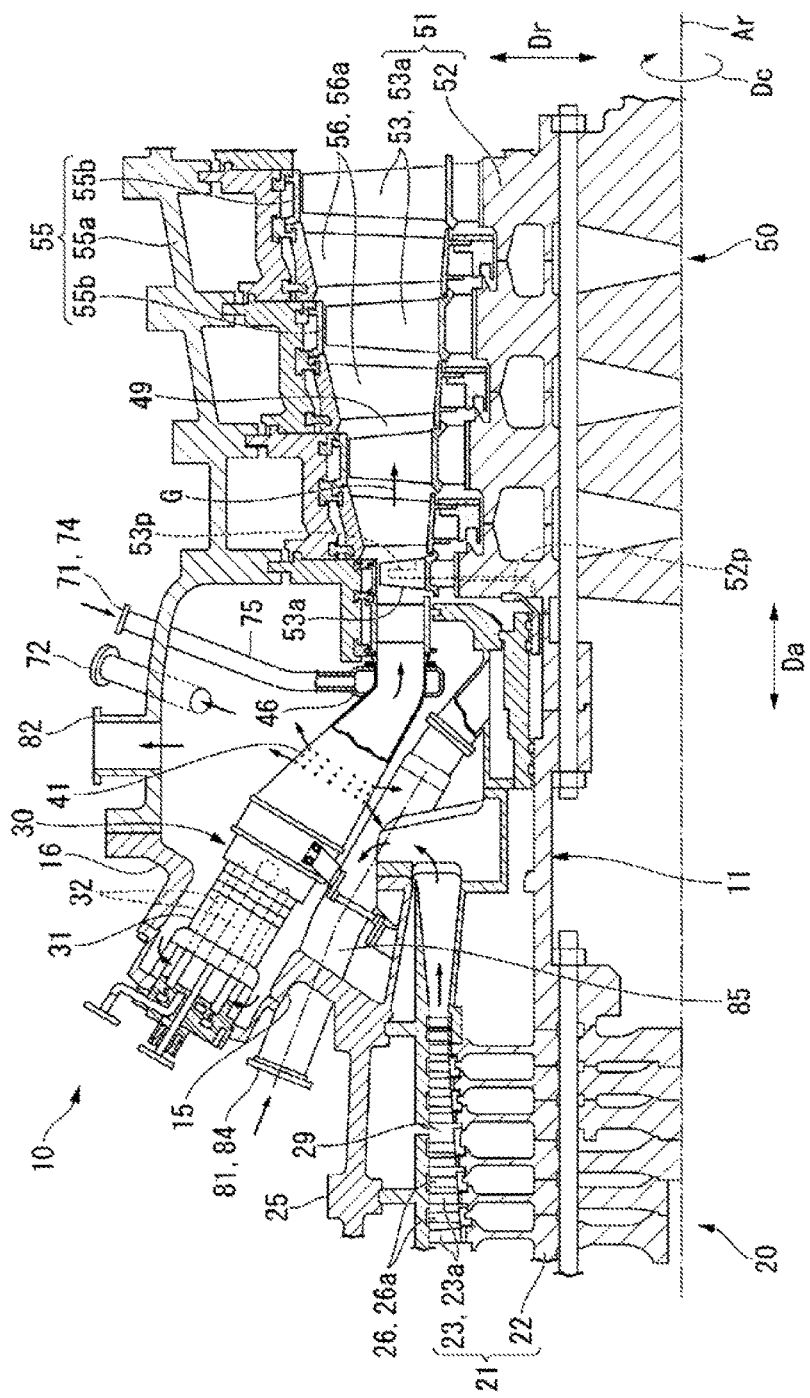
FIG. 2 is a cross-sectional view of the main portions of the gas turbine of the embodiment according to the present invention.

As illustrated in FIG. 2, the compressor 20 includes a compressor rotor 21 that rotates about an axis Ar, a compressor easing 25 that covers the compressor rotor 21 while allowing the compressor rotor 21 to rotate, and a plurality of vane stages 26. Note that, in the description below, a direction in which the axis Ar extends is referred to as an axial direction Da, a compressor side in the axial direction Da is referred to as an upstream side, and a turbine side is referred to as a downstream side. Further, a circumferential direction around the axis Ar is simply referred to as a circumferential direction Dc, and a perpendicular direction with respect to the axis Ar is referred to as a radial direction Dr. The compressor rotor 21 includes a rotor shaft 22 that extends in the axial direction Da along the axis Ar and a plurality of blade stages 23 attached to the rotor shaft 22. The plurality of blade stages 23 are arranged side by side in the axial direction Da. Each of the blade stages 23 is constituted of a plurality of blades 23a arranged side by side in the circumferential direction Dc. The vane stage 26 is disposed on the downstream side of each of the plurality of blade stages 23. Each of the vane stages 26 is provided inside the compressor casing 25. Each of the vane stages 26 is constituted of a plurality of vanes 26a arranged side by side in the circumferential direction Dc. An annular space, which is defined between the outer peripheral side of the rotor shaft 22 in the radial direction and the inner peripheral side of the compressor easing 25 in the radial direction, in an area in which the vanes 26a and the blades 23a are arranged in the axial direction Da, forms an air compression flow channel 29 in which air is compressed while flowing therethrough.

The turbine 50 includes a turbine rotor 51 that rotates about the axis Ar, a turbine casing 55 that covers the turbine rotor 51 while allowing the turbine rotor 51 to rotate, and a plurality of vane stages 56. The turbine rotor 51 includes a rotor shaft 52 that extends in the axial direction Da along the axis Ar and a plurality of blade stages 53 attached to the rotor shaft 52. The plurality of blade stages 53 are arranged side by side in the axial direction Da. Each of the blade stages 53 is constituted of a plurality of blades 53a arranged side by side in the circumferential direction Dc. The vane stage 56 is disposed on the upstream side of each of the plurality of blade stages 53. Each of the vane stages 56 is provided inside the turbine casing 55. Each of the vane stages 56 is constituted of a plurality of vanes 56a arranged side by side in the circumferential direction Dc. The turbine casing 55 includes a cylindrical turbine casing main body 55a that forms an outer shell of the turbine casing 55 and a plurality of ring segments 55b that are fixed inside the turbine casing 55. Each of the plurality of ring segments 55b is provided at a position between the plurality of vane stages 56. Therefore, the blade stage 53 is disposed on the inner side of each of the ring segments 55b in the radial direction. An annular space, which is defined between the outer peripheral side of the rotor shaft 52 and the inner peripheral side of the turbine casing 55, in an area in which the vanes 56a and the blades 53a are arranged in the axial direction Da, forms a combustion gas flow channel 59 through which combustion gas G from the combustor 30 flows. In the rotor shaft 52, a cooling air flow channel 52p is formed, through which cooling air flows. Further, in each of the blades 53a, a cooling air flow channel 53p is formed, which is communicated with the cooling air flow channel 52p of the rotor shaft 52. An end of the cooling air flow channel 53p formed in the blade 53a is open at a surface of the blade 53a. More specifically, the cooling air flow channel 53p formed in the blade 53a is communicated with the combustion gas flow channel 59.

The compressor rotor 21 and the turbine rotor 51 are positioned on the same axis Ar and are connected with each other to form a gas turbine rotor 11. A rotor of a generator (not illustrated) is connected to this gas turbine rotor 11, for example. Further, the compressor casing 25 and the turbine casing 55 are connected with each other to form a gas turbine casing 15. The air compression flow channel 29 and the combustion gas flow channel 59 are separated from each other in the axial direction Da. In the gas turbine casing 15, an intermediate easing 16 is formed between the air compression flow channel 29 and the combustion gas flow channel 59 in the axial direction Da. The combustor 30 is attached to this intermediate casing 16.

Figure 3:
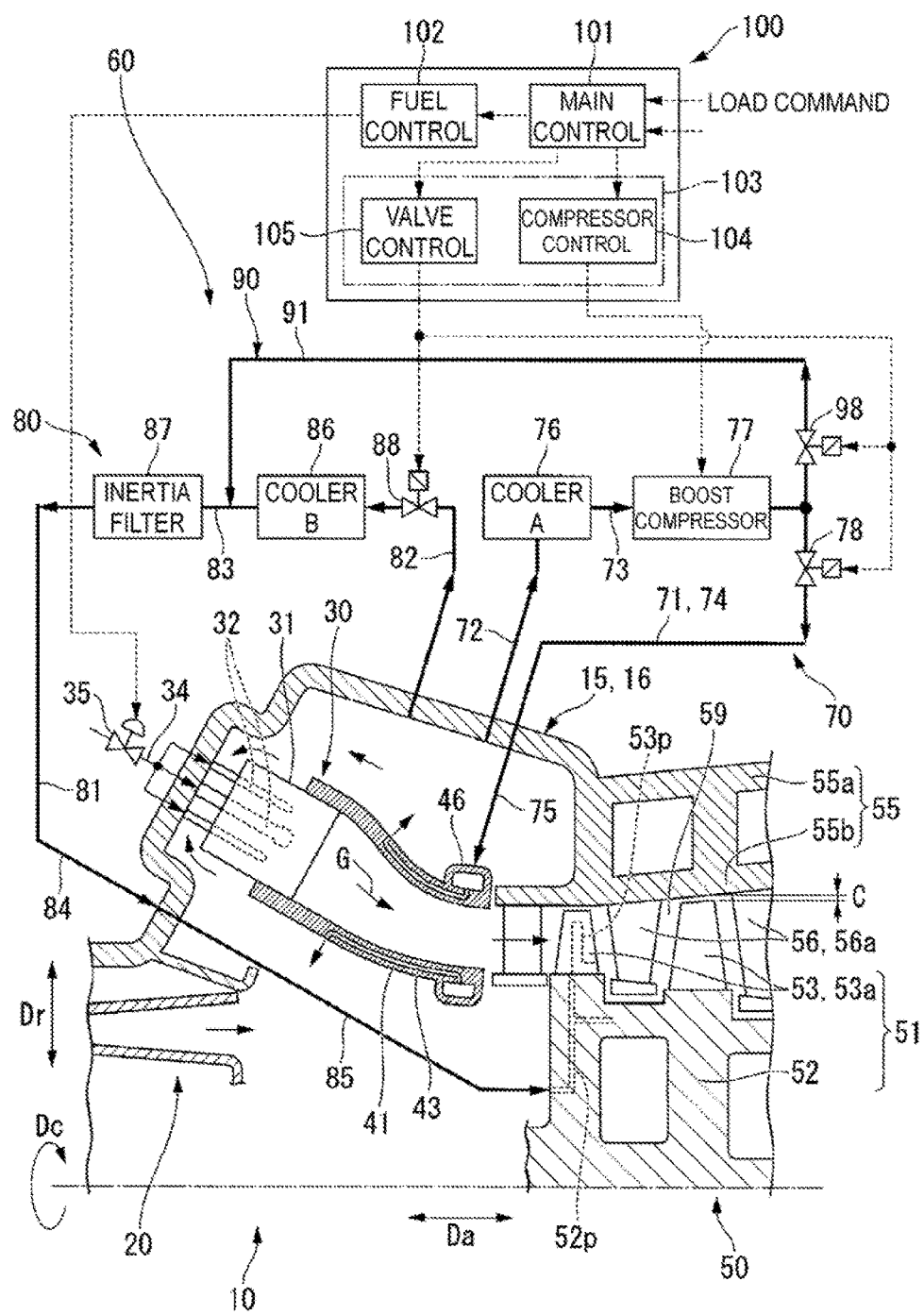
FIG. 3 is an explanatory diagram illustrating a configuration of a cooling device of the embodiment according to the present invention.

As illustrated in FIG. 2 and FIG. 3, the combustor 30 includes a combustion liner (or a transition piece) 41 through which the high-temperature, high-pressure combustion gas G flows into the combustion gas flow channel 59 of the turbine 50, and a fuel supply unit 31 that supplies fuel and compressed air into the combustion liner 41. The fuel supply unit 31 includes a plurality of nozzles 32 that inject the fuel into the combustion liner 41. A fuel line 34 is connected to each of the nozzles 32. The fuel line 34 is provided with a fuel flow rate adjustment valve 35 that adjusts a flow rate of the fuel supplied to the plurality of nozzles 32. The combustor 30 further includes a cooling air manifold 46 that is positioned closer to the combustion gas flow channel 59 of the turbine 50 and fixed to the outer periphery of the combustion liner 41. The cooling air manifold 46 and the outer periphery of the combustion cylinder 41 define a space therebetween, which allows the cooling air to be accumulated therein.

Figure 4:
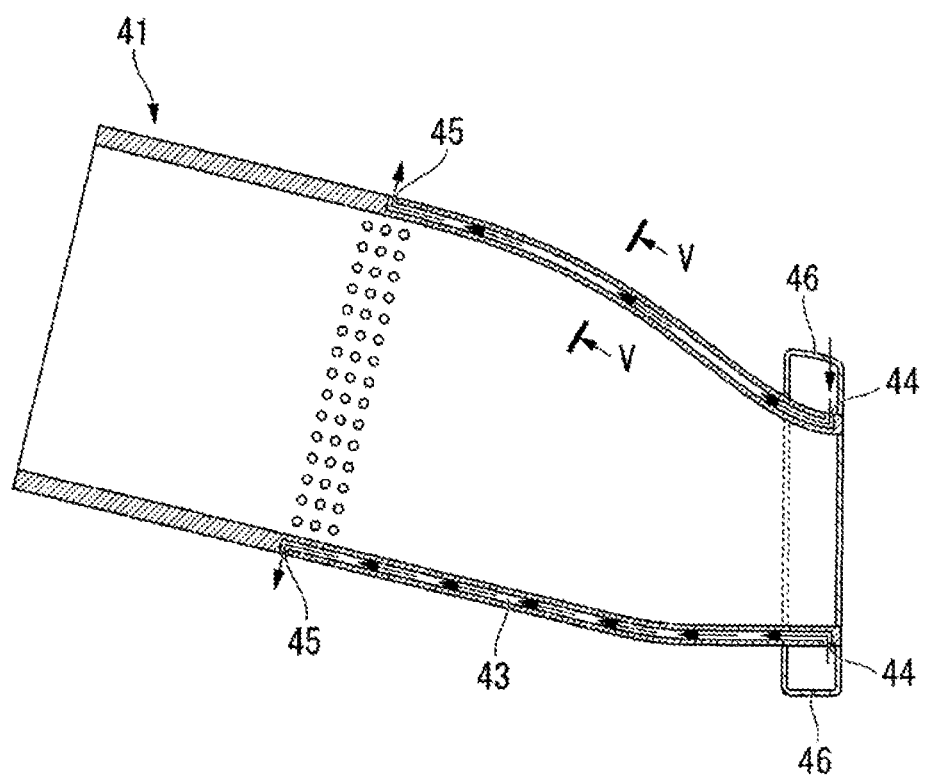
FIG. 4 is a cross-sectional view of a combustion liner of the embodiment according, to the present invention.
Figure 5:
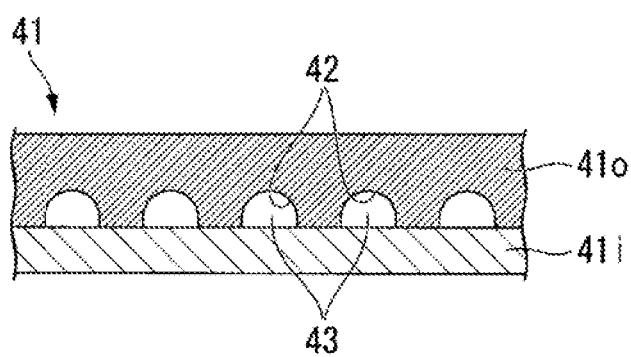
FIG. 5 is a cross-sectional view taken along a line V-V of FIG. 4.
Figure 6:
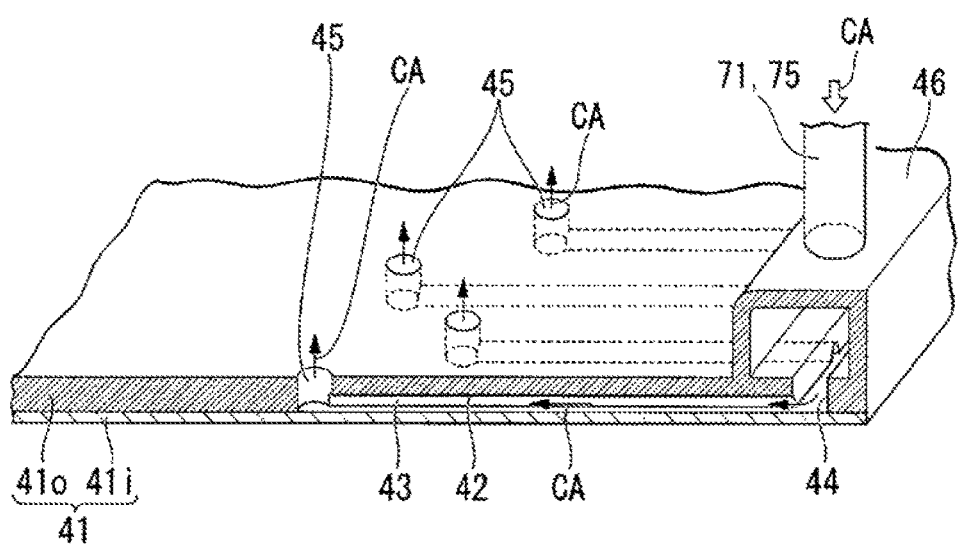
FIG. 6 is a cutaway perspective view of main portions of the combustion liner of the embodiment according to the present invention.

As illustrated in FIGS. 4 to 6, the combustion liner 41 is constituted of an outer peripheral wall plate 41o and an inner peripheral wall plate 41i. The outer peripheral wall plate 41o and the inner peripheral wall plate 41i are bonded together by brazing and the like. In one of the outer peripheral wall plate 41o and the inner peripheral wall plate 41i, a plurality of grooves 42 are formed, each of which is recessed in the direction away from the other wall plate and is long in the direction in which the central axis of the combustion liner 41 extends. Spaces between the inner surfaces of the grooves 42 and the surface of the other wall plate form cooling air flow channels 43 through which the cooling air flows. In sections of the outer peripheral wall plate 41o where the cooling air manifold 46 is provided, a plurality of inlet holes 44 are formed penetrating into a space inside the cooling air manifold 46 from the cooling air flow channels 43. Further, in an area of the outer peripheral wall plate 41o located on the upstream side of the cooling air manifold 46, a plurality of outlet holes 45 are formed over the whole circumference of the area. The plurality of outlet holes 45 penetrate from the cooling air flow channels 43 to the inner side of the intermediate casing 16 which is the outer side of the combustion liner 41. Note that the upstream side mentioned here is the upstream side of the combustor 30, namely, a side on which the fuel supply unit 31 is positioned with respect to the combustion liner 41.

The compressor 20 sucks in outside air and compresses the air in the course of the air passing through the air compression flow channel 29. The air that is compressed, namely, the compressed air, flows into the intermediate casing 16 from the air compression flow channel 29 of the compressor 20. The compressed air is supplied into the combustion liner 41 via the fuel supply unit 31 of the combustor 30. Fuel is injected into the combustion liner 41 from the plurality of nozzles 32 of the fuel supply unit 31. The fuel is combusted in the compressed air inside the combustion liner 41. The combustion gas G is generated as a result of this combustion, and this combustion gas G flows into the combustion gas flow channel 59 of the turbine 50 from the combustion liner 41. The turbine rotor 51 rotates as a result of the combustion gas G passing through the combustion gas flow channel 59.

As described above, of the component parts of the gas turbine 10, the combustion liner 41, the blades 53a, the vanes 56a, the ring segments 55b, and the like are all in contact with the high-temperature combustion gas G. Thus, the combustion liner 41, the blades 53a, the vanes 56a, the ring segments 55b, and the like constitute hot parts.

As illustrated in FIG. 3, the cooling device 60 includes a hot-part cooling system 70 that extracts the air inside the intermediate casing 16 from the interior of the intermediate casing 16, cools and then pressurizes the air, and guides the air to the combustion liner 41, a rotor cooling system 80 that extracts the air inside the intermediate casing 16 from the interior of the intermediate casing 16, cools the air, and then guides the air to the rotor shaft 52 of the turbine rotor 51, and a connecting system 90 that guides the air inside the hot-part cooling system 70 to the rotor cooling system 80.

The hot-part cooling system 70 includes a hot-part cooling line 71 that extracts the compressed air inside the intermediate casing 16 from the interior of the intermediate casing 16 and guides the air to the cooling air manifold 46 provided on the combustion liner 41. Further, the hot-part cooling system 70 includes a cooler A 76, a boost compressor 77, and a hot-part cooling control valve 78, which are all provided in the hot-part cooling line 71.

The cooler A 76 may be of any type of cooler as long as the cooler can cool the compressed air extracted from the intermediate casing 16. More specifically, the cooler A 76 may be of a water-cooling type that cools the compressed air using a cooling medium such as water, or an air-cooling type that cools the compressed air by feeding air to a line, through which the compressed air passes, using a fan or the like, for example. The boost compressor 77 pressurizes the compressed air extracted from the intermediate casing 16. This boost compressor 77 is capable of operating independently of the gas turbine 10. Thus, the boost compressor 77 can operate even when the gas turbine 10 is stopped.

The hot-part cooling line 71 includes a casing-to-cooler A line 72 that connects the intermediate casing 16 and the cooler A 76, a cooler A-to-compressor line 73 that connects the cooler A 76 and a suction port of the boost compressor 77, a compressor-to-casing line 74 that connects a discharge port of the boost compressor 77 and the intermediate casing 16, and an in-casing A line 75 that connects the compressor-to-casing line 74 and the cooling air manifold 46 provided on the combustion liner 41. The hot-part cooling control valve 78 is provided in the compressor-to-easing line 74. The compressed air inside the intermediate casing 16 can flow into the cooling air manifold 46 through the casing-to-cooler A line 72, the cooler A-to-compressor line 73, the compressor-to-casing line 74, and the in-casing A line 75.

The rotor cooling system 80 includes a rotor cooling line 81 that extracts the compressed air inside the intermediate casing 16 from the interior of the intermediate casing 16 and guides the air to the rotor shaft 52 of the turbine 50. Further, the rotor cooling system 80 includes a cooler B 86 provided in the rotor cooling line 81, an inertia filter 87, and a rotor cooling control valve 88.

Like the cooler A 76, the cooler B 86 may be of any type of cooler as long as the cooler can cool the compressed air extracted from the intermediate casing 16, and may be of the water-cooling type or the air-cooling type, for example. A curved flow channel is formed inside the inertia filter 87. The inertia filter 87 has a portion configured to capture foreign substances in the air that flow straight on due to inertia. Note that a filter used here does not necessarily have to be such an inertia filter. Further, the rotor cooling system 80 does not necessarily require the filter, and the filter may be omitted.

The rotor cooling line 81 includes a casing-to-cooler B line 82 that connects the intermediate casing 16 and the cooler B 86, a cooler B-to-filter line 83 that connects the cooler B 86 and the inertia filter 87, a filter-to-casing line 84 that connects the inertia filter 87 and the intermediate casing 16, and an in-casing B 85 that connects the filter-to-casing line 84 and the rotor shaft 52 of the turbine 50. The rotor cooling control valve 88 is provided in a casing-to-cooler line. The in-casing B line 85 is connected to the above-described cooling air flow channel 52p formed in the rotor shaft 52 of the turbine 50.

The connecting system 90 includes a connecting line 91 that guides the air inside the hot-part cooling line 71 into the rotor cooling line 81, and a connection control valve 98 provided in the connecting line 91. One end of the connecting line 91 is connected to a position between the boost compressor 77 provided in the compressor-to-casing line 74 and the hot-part cooling control valve 78. Further, the other end of the connecting line 91 is connected to the cooler B-to-filter line 83. Further, the connecting system 90 includes a control device 100 that controls an operation of the connection control valve 98.

The control device 100 includes a main control unit 101 into which load commands from the outside, signals from various sensors, and the like are input, a fuel control unit 102 that controls a lift of the fuel flow rate adjustment valve 35 in accordance with an instruction from the main control unit 101, a compressor control unit 104 that controls an operation of the boost compressor 77, and a valve control unit 105 that controls an operation of each of the control valves 78, 88, and 98 of the cooling device 60. The valve control unit 105 of this control device 100 controls not only the operation of the above-described connection control valve 98, but also the operations of the hot-part cooling control valve 78 and the rotor cooling control valve 88. The valve control unit 105 and the compressor control unit 104 constitute a control device 103 of each driving unit (each of the control valves and the boost compressor 77) provided in the cooling device 60.

Next, an operation of the above-described gas turbine installation will be described.

As described above, during the operation of the gas turbine 10, the compressor 20 compresses the air to generate the compressed air.

The main control unit 101 of the control device 100 determines a flow rate of the fuel to be supplied to the plurality of nozzles 32 of the fuel supply unit 31 in accordance with the load commands or the signals from the various sensors. The fuel control unit 102 determines a valve lift of the fuel flow rate adjustment valve 35 in accordance with the flow rate of the fuel determined by the main control unit 101, and transmits a signal indicating the valve lift to the fuel flow rate adjustment valve 35. The fuel flow rate adjustment valve 35 is driven in accordance with this signal, and is set to the valve lift indicated by the signal. As a result, the fuel is supplied to the plurality of nozzles 32 at the flow rate determined by the main control unit 101.

The compressed air generated by the compressor 20 flows into the combustor 30 via the interior of the intermediate casing 16. The fuel supply unit 31 of the combustor 30 supplies the compressed air into the combustion liner 41. Further, the plurality of nozzles 32 of the fuel supply unit 31 inject the fuel supplied via the fuel flow rate adjustment valve 35 into the combustion liner 41. The fuel is combusted in the compressed air inside the combustion liner 41. This combustion generates the combustion gas G, and this combustion gas G flows into the combustion gas flow channel 59 of the turbine 50 from the combustion liner 41. The turbine rotor 51 rotates as a result of this combustion gas G passing through the combustion gas flow channel 59.

During the operation of this gas turbine 10, the hot-part cooling control valve 78 of the hot-part cooling system 70 is open in accordance with the instruction from the valve control unit 105, and the connection control valve 98 of the connecting system 90 is closed in accordance with the instruction from the valve control unit 105. Further, during the operation of this gas turbine 10, the boost compressor 77 of the hot-part cooling system 70 is being driven in accordance with the instruction from the compressor control unit 104. Thus, part of the compressed air inside the intermediate casing 16 is extracted, then caused to flow into the cooler A 76 through the casing-to-cooler A line 72 of the hot-part cooling system 70, and cooled in the cooler A 76. The compressed air that has been cooled flows into the boost compressor 77, through the cooler A-to-compressor line 73, as the cooling air, and is pressurized further in the boost compressor 77. This cooling air flows into the cooling air manifold 46 of the combustor 30 through the compressor-to-casing line 74 and the in-casing A line 75.

As illustrated in FIG. 6, cooling air CA that has flowed into the cooling air manifold 46 passes through the cooling air flow channel 43 of the combustion liner 41 through the inlet holes 44 of the combustion liner 41, and returns to the interior of the intermediate casing 16 through the outlet holes 45 of the combustion liner 41. The cooling air CA, which is the compressed air cooled in the cooler A 76, exchanges heat with the combustion liner 41 so as to cool the combustion liner 41 in the course of passing through the cooling air flow channel 43 of the combustion liner 41.

As described above, the compressed air that cools the combustion liner 41 is extracted from the interior of the intermediate casing 16, pressurized by the boost compressor 77, and then returned to the interior of the intermediate casing 16 through the cooling air flow channel 43 of the combustion liner 41.

During the operation of the gas turbine 10, the rotor cooling control valve 88 of the rotor cooling system 80 is open in accordance with the instruction from the valve control unit 105. Thus, part of the compressed air inside the intermediate casing 16 is extracted, then caused to flow into the cooler B 86 through the casing-to-cooler B line 82 of the rotor cooling system 80, and cooled in the cooler B 86. The compressed air that has been cooled flows into the inertia filter 87, through the cooler B-to-filter line 83, as the cooling air, and foreign substances are removed in the inertia filter 87. This cooling air flows into the cooling air flow channel 52p formed in the rotor shaft 32 of the turbine rotor 51, through the filter-to-easing line 84 and the in-casing B line 85. The cooling air exchanges heat with the rotor shaft 52 so as to cool the rotor shaft 32 in the course of passing through the cooling air flow channel 52p of the rotor shaft 52. Further, the cooling air flows into the cooling air flow channel 53p, which is formed in each of the plurality of blades 53a of the turbine rotor 51. The cooling air exchanges heat with the blade 53a so as to cool the blade 53a in the course of passing through the cooling air flow channel 53p of the blade 53a. The cooling air that has cooled the blade 53a flows into the combustion gas flow channel 59 from the cooling air flow channel 53p, and is mixed into the combustion gas G.

Figure 7:
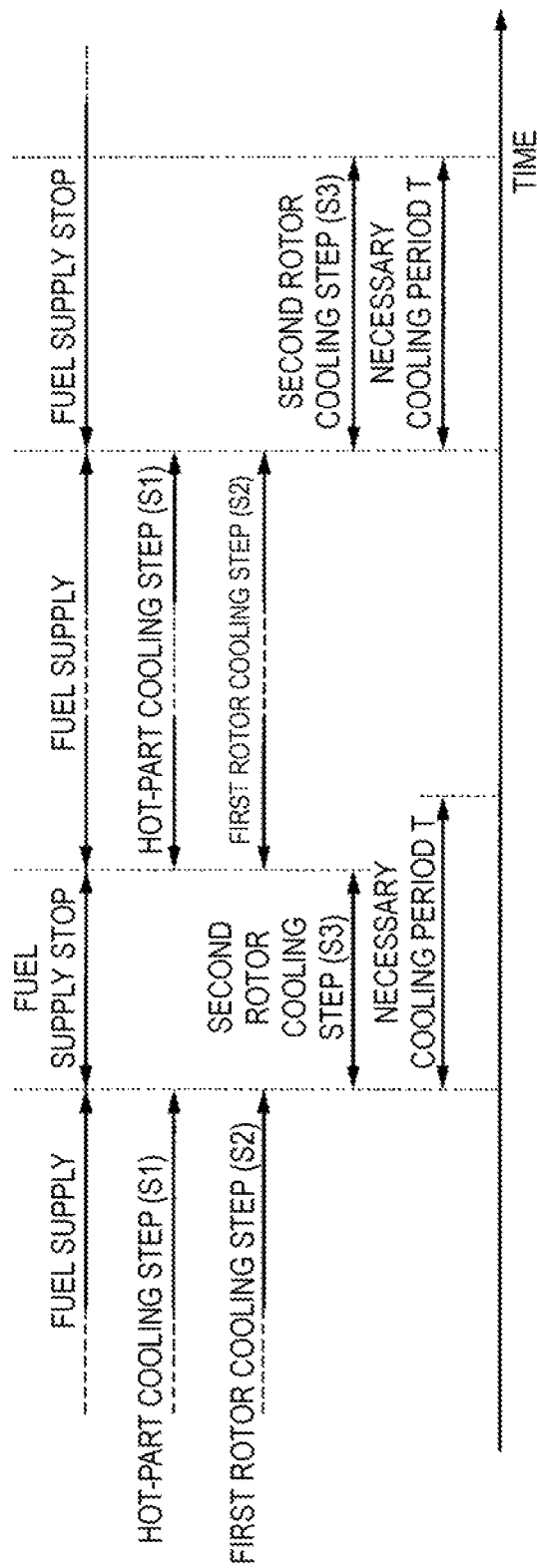
FIG. 7 is a timing chart of various cooling steps of the embodiment according to the present invention.

As described above, during the operation of the gas turbine in which the fuel is being supplied to the gas turbine 10, as illustrated in FIG. 7, the combustion liner 41, which is a hot part, is cooled as a result of the cooling air being supplied to the combustion liner 41 from the hot-part cooling system 70 (S1: a hot-part cooling step), and at the same time, the turbine rotor 51 is cooled as a result of the cooling air being supplied to the turbine rotor 51 from the rotor cooling system 80 (S2: a first rotor cooling step).

The main control unit 101 instructs the fuel control unit 102 to stop supplying the fuel by the load command or the like from the outside, and at the same time, notifies the valve control unit 105 of the fact that the fuel supply has been stopped. Upon receiving this instruction, the fuel control unit 102 transmits a signal indicating a zero valve lift to the fuel flow rate adjustment valve 35. More specifically, the fuel control unit 102 instructs the fuel flow rate adjustment valve 35 to close the valve. As a result, the fuel flow rate adjustment valve 35 is closed, thereby stopping the fuel from flowing into the plurality of nozzles 32 of the fuel supply unit 31.

Further, upon receiving, from the main control unit 101, the notification indicating that the fuel supply has been stopped, the valve control unit 105 instructs the hot-part cooling control valve 78 and the rotor cooling control valve 88 to close, and at the same time, instructs the connection control valve 98 to open. As a result, the hot-part cooling control valve 78 and the rotor cooling control valve 88 are closed, and the connection control valve 98 is opened. Thus, part of the air inside the intermediate casing 16 is extracted, then caused to flow into the cooler A 76 through the casing-to-cooler A line 72 of the hot-part cooling system 70, and cooled in the cooler A 76. The air that has been cooled flows into the boost compressor 77, through the cooler A-to-compressor line 73, as the cooling air, and is pressurized in the boost compressor 77. This cooling air flows into the inertia filter 87 of the rotor cooling system 80, through part of the compressor-to-casing line 74 and the connecting line 91 of the connecting system 90, and foreign substances are removed in the inertia filter 87. The cooling air flows into the cooling air flow channel 52p formed in the rotor shaft 52 of the turbine rotor 51, through the filter-to-casing line 84 and the in-casing B line 85 of the rotor cooling system 80. The cooling air exchanges heat with the rotor shaft 52 so as to cool the rotor shaft 52 in the course of passing through the cooling air flow channel 52p of the rotor shall 52. Further, the cooling air flows into the combustion gas flow channel 59 through the cooling air flow channel 53p, which is formed in each of the plurality of blades 53a of the turbine rotor 51.

In a state in which the fuel supply to the gas turbine 10 is stopped, the combustion gas G is not generated, and the compressor rotor 21 and the turbine rotor 51 are not actually rotating, a pressure inside the intermediate casing 16 and a pressure in the combustion gas flow channel 59 are substantially the same as the atmospheric pressure. Thus, in the present embodiment, in the state in which the fuel supply is stopped, part of the compressed air is extracted from the interior of the intermediate casing 16, pressurized by the boost compressor 77, and then supplied to the turbine rotor 51 so as to cool the turbine rotor 51 (S3; a second rotor cooling step).

As described above, in the state in which the fuel supply to the gas turbine 10 is stopped, since the hot-part cooling control valve 78 is closed, the cooling air pressurized by the boost compressor 77 of the hot-part cooling system 70 is not supplied to the cooling air manifold 46 of the combustor 30. More specifically, when the fuel supply to the gas turbine 10 is stopped, the hot-part cooling step (S1) is terminated.

Further, as described above, in the state in which the fuel supply to the gas turbine 10 is stopped, since the rotor cooling control valve 88 is closed, the air inside the intermediate casing 16 does not flow into the cooler B 86 through the casing-to-cooler B line 82 of the rotor cooling system 80. More specifically, when the fuel supply to the gas turbine 10 is stopped, the first rotor cooling step (S2) is also terminated.

Specifically, as illustrated in FIG. 7, when the fuel supply to the gas turbine 10 is stopped, the hot-part cooling step (S1) and the first rotor cooling step (S2) are terminated, while on the other hand, the second rotor cooling step (S3) is started.

In the state in which the fuel supply to the gas turbine 10 is stopped and the combustion gas G is not generated, the temperature of the turbine rotor 51 disposed inside the turbine casing 55 drops more slowly than that of the turbine casing 55 exposed to the outside air. Therefore, after the fuel supply to the turbine rotor 51 is stopped, the amount of decrease in the thermal expansion, per unit time, of the turbine rotor 51 is less than the amount of decrease in the thermal expansion, per unit time, of the turbine easing 55. Thus, after the fuel supply to the turbine rotor 51 is stopped, a tip clearance C is temporarily decreased, the tip clearance C being a gap between the outer end of the blade 53a of the turbine rotor 51 in the radial direction and the inner peripheral surface of the turbine casing 55, namely, the inner peripheral surface of the ring segment 55b. As described above, when the gas turbine 10 is started with the tip clearance C decreased, the position of the outer end, in the radial direction, of the blade 53a is displaced toward the outer side in the radial direction due to the centrifugal force acting on the turbine rotor 51, which in turn may cause the blade 53a of the turbine rotor 51 to come into contact with the inner peripheral surface of the turbine casing 55.

Thus, in the present embodiment, even in the state in which the fuel supply to the gas turbine 10 is stopped and the combustion gas G is not generated, the air extracted from the intermediate casing 16 is pressurized by the boost compressor 77 of the hot-part cooling system 70, and this air is supplied to the interior of the turbine rotor 51 so as to cool the turbine rotor 51.

Incidentally, when a predetermined necessary cooling period elapses after the fuel supply to the gas turbine 10 is stopped, the turbine rotor 51 and the turbine casing 55 cool down sufficiently, and a temperature difference between the turbine rotor 51 and the turbine casing 55 almost disappears. Thus, when the predetermined necessary cooling period elapses after the fuel supply to the gas turbine 10 is stopped, the tip clearance C becomes greater than the tip clearance C obtained in a case when the turbine rotor 51 is not cooled during the necessary cooling period, and the risk of the blade 53a of the turbine rotor 51 coming into contact with the inner peripheral surface of the turbine casing 55 is thus eliminated.

As described above, in the present embodiment, during the predetermined necessary cooling period after the fuel supply to the gas turbine 10 is stopped, the air extracted from the intermediate casing 16 is supplied to the interior of the turbine rotor 51 so as to cool the turbine rotor 51. Thus, as illustrated in FIG. 7, even when the gas turbine 10 is started during, the necessary cooling period and the fuel supply to the gas turbine 10 is resumed, namely, even when the gas turbine 10 is hot-started, the contact between the blade 53a of the turbine rotor 51 and the inner peripheral surface of the turbine casing 55 can be inhibited.

As illustrated in FIG. 7, when the gas turbine 10 is started during a necessary cooling period T and the fuel supply to the gas turbine 10 is resumed, the second rotor cooling step (S3) is terminated, and the first rotor cooling step (S2) and, a hot-member cooling step (S1) are resumed. Specifically, when the fuel supply to the gas turbine 10 is resumed, in accordance with the instructions from the valve control unit 105, the hot-part cooling control valve 78 and the rotor cooling control valve 88 are opened, and the connection control valve 98 is closed.

Further, in the present embodiment, when the necessary cooling period elapses without the gas turbine 10 being started during the necessary cooling period T, the main control unit 101 notifies the compressor control unit 104 of the fact that the necessary cooling period T has elapsed. Upon receiving the notification, the compressor control unit 104 stops the boost compressor 77. As a result, when the necessary cooling period T elapses without the gas turbine 10 being started during the necessary cooling period T, the second rotor cooling step (S3) is also terminated.

As described above, in the present embodiment, since the turbine rotor 51 is cooled during the necessary cooling period T after the fuel supply to the gas turbine 10 is stopped, even when the gas turbine 10 is hot-started, namely, the gas turbine 10 is started during the necessary cooling period T, the contact between the blade 53a of the turbine rotor 51 and the inner peripheral surface of the turbine casing 55 can be inhibited. As a result, in the present embodiment, the tip clearance C obtained at a time of steady operation can be further decreased, and efficiency of the gas turbine 10 can thus be improved.

Provided that the hot-part cooling system 70 and the rotor cooling system 80 are already provided in the gas turbine 10, the cooling device 60 of the present embodiment can be formed by newly installing the connecting system 90. Thus, the cooling of the turbine rotor 51 can be performed in a state where the fuel supply to the gas turbine 10 has been stopped. Therefore, in the present embodiment, installation costs can be reduced compared with a case in which a device for cooling the turbine rotor 51 after the fuel supply to the gas turbine 10 is stopped is separately provided.

First Modified Example

Figure 8:
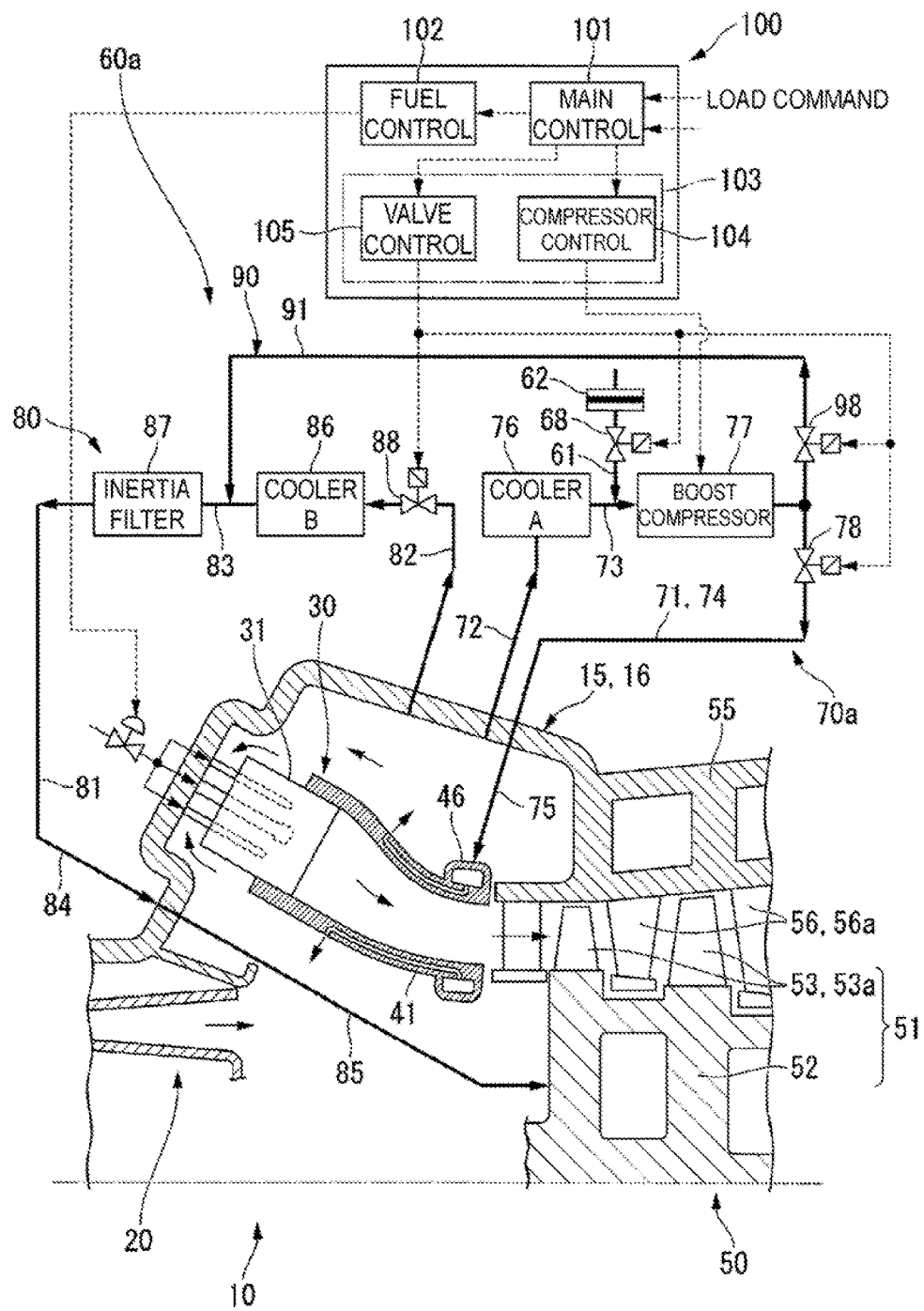
FIG. 8 is an explanatory diagram illustrating a configuration of a cooling device of a first modified example of the embodiment according to the present invention.

A first modified example of the above-described embodiment of the gas turbine installation will be described below with reference to FIG. 8.

A gas turbine installation of the present modified example is a gas turbine installation obtained by changing part of the cooling device 50 in the gas turbine installation of the above-described embodiment.

A hot-part cooling system 70a in a cooling device 60a of the present modified example is a hot-part cooling system obtained by adding, to the hot-part cooling system 70 of the above-described embodiment, an air intake line 51 that takes in atmospheric air, a filter 62 that, removes foreign substances from the atmospheric air passing through the air intake line 61, and an air intake control valve 58 provided in the air intake line 61.

One end of the air intake line 61 is open to the atmospheric air, and the other end thereof is connected to the cooler A-to-compressor line 73. The filter 62 is provided in the air intake line 61. Further, the air intake control valve 68 is provided in the air intake line 61 at a position between the filter 62 and a connection position of the air intake line 61 with the cooler A-to-compressor line 73. The air intake control valve 68 is controlled by the valve control unit 105 of the control device 100.

In the present modified example, while the fuel is being supplied to the gas turbine 10, the valve control unit 105 instructs the hot-part cooling control valve 78 and the rotor cooling control valve 88 to open, and at the same time, instructs the connection control valve 98 to close, in the same manner as in the above-described embodiment. Further, in the present modified example, the valve control unit 105 instructs the air intake control valve 68 to close. As a result, the hot-part cooling control valve 78 and the rotor cooling control valve 88 are opened, and the connection control valve 98 and the air intake control valve 68 are closed. Thus, while the fuel is being supplied to the gas turbine 10, in the same manner as in the above-described embodiment, the compressed air inside the intermediate casing 16 is extracted by the hot-part cooling system 70a, and after being cooled further, this compressed air is supplied to the combustion liner 41 as the cooling air. Further, the compressed air inside the intermediate casing 16 is extracted by the rotor cooling system 80, and after being cooled further, this compressed air is supplied to the turbine rotor 51 as the cooling air. Specifically, in the present modified example also, while the fuel is being supplied to the gas turbine 10, the hot-part cooling step (S1) and the first rotor cooling step (S2) are performed in the same manner as in the above-described embodiment.

Further, in the present modified example also, when the fuel supply to the gas turbine 10 is stopped, the valve control unit 105 instructs the hot-part cooling control valve 78 and the rotor cooling control valve 88 to close, and at the same time, instructs the connection control valve 98 to open, in the same manner as in the above-described embodiment. Further, in the present modified example, the valve control unit 105 instructs the air intake control valve 68 to open. As a result, the hot-part cooling control valve 78 and the rotor cooling control valve 88 are closed, and the connection control valve 98 and the air intake control valve 68 are opened. Thus, in the present modified example, the outside air is taken into the boost compressor 77 as the cooling air, through the filter 62 and the air intake line 61, and is pressurized. After that, the cooling, air pressurized by the boost compressor 77 is supplied to the turbine rotor 51, in the same manner as in the above-described embodiment, through the connecting line 91 of the connecting system 90, and the inertia filter 87, the filler-to-easing line 84, and the in-casing B line 85 of the rotor cooling system 80.

Even after the fuel supply to the gas turbine 10 is stopped, the temperature of the outside air is basically lower than the temperature of the air inside the intermediate casing 16. Thus, even when the outside air is taken into the hot-part cooling system 70a while the fuel supply to the gas turbine 10 is stopped, the turbine rotor 51 can be cooled.

As described above, in the present modified example, the second rotor cooling step (S3) is implemented by taking the outside air into the hot-part cooling system 70a and supplying the outside air to the turbine rotor 51 as the cooling air.

For example, when the cooler A 76 of the hot-part cooling system 70a is, configured to not be able to cool the air inside the intermediate casing 16 after the fuel supply to the gas turbine 10 is stopped, the cooling of the turbine rotor 54 can be performed, in a state where the fuel supply to the gas turbine 10 has been stopped, by taking in the outside air as a cooling medium for the turbine rotor 51, as in the present modified example.

Note that in the present modified example, a second air intake control valve may be further provided in the cooler A-to-compressor line 73, at a position between the cooler A 76 and a connection position of the cooler A-to-compressor line 73 with the air intake line 61, or in the casing-to-cooler A line 72. The second air intake control valve is opened when the air intake control valve 68 provided in the air intake line 61, namely, the first air intake control valve 68 is closed, and is closed when the first air intake control valve 68 is open. In this way, the provision of the second air intake control valve allows the boost compressor 77 to exclusively take in the outside air through the air intake line 61 in the second rotor cooling step (S3). Alternatively, a three-way valve may be provided instead of the first air intake control valve 68 and the second air intake control valve.

Second Modified Example

A second modified example of the above-described embodiment of the gas turbine installation will be described with reference to FIG. 9.

The hot-part cooling systems of the above-described embodiment and first modified example are configured to cool the combustion liner 41 among the hot parts of the gas turbine 10. However, the hot-part cooling system may be configured to cool other hot parts.

Figure 9:
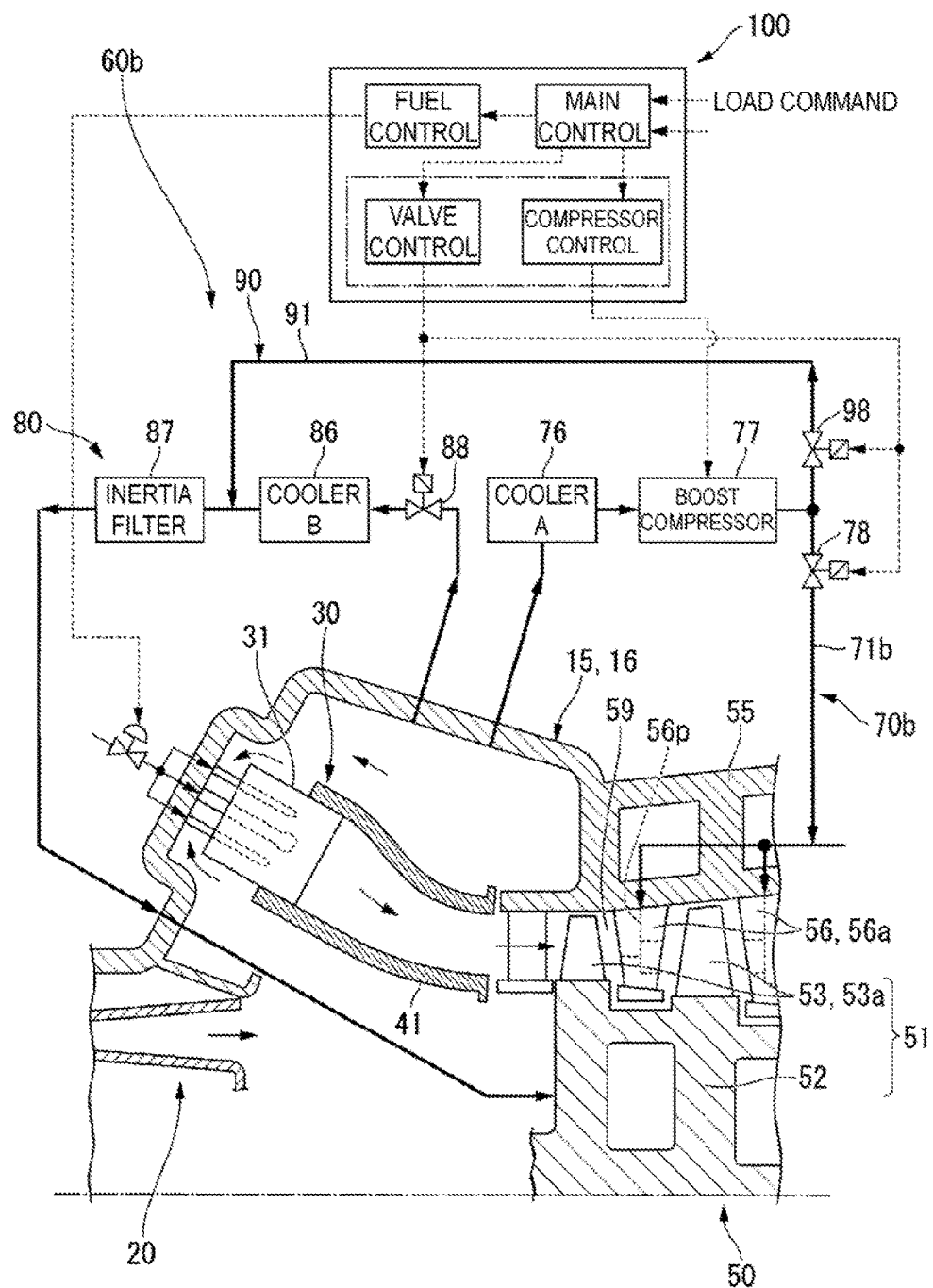
FIG. 9 is an explanatory diagram illustrating a configuration of a cooling device of a second modified example of the embodiment according to the present invention.

For example, as illustrated in FIG. 9, a hot-part cooling system 70b of a cooling device 60b may be configured to cool the plurality of vanes 56a. In this case, a hot-part cooling line 71b of the hot-part cooling system 70b is connected with the plurality of vanes 56a of the turbine 50. A cooling air flow channel 56p, through which the cooling air flows, is formed in the vane 56a. The hot-part cooling line 71b is connected with the cooling air flow channel 56p. The cooling air flow channel 56a is open at the surface of the vane 56a. More specifically, the cooling air flow channel 56p formed in the vane 56a is communicated with the combustion gas flow channel 59. Thus, in the present modified example, the vane 56a, which is a hot part can be cooled.

Note that, in the present modified example, a method of using steam or the like may be considered for cooling the combustion liner 41. Further, in the present modified example, the cooling air is discharged into the combustion gas flow channel 59, but instead of this, the cooling air may be collected.

Further, the hot-part cooling system may be configured to cool the ring segments 55b illustrated in FIG. 2. Furthermore, the hot-part cooling system may be configured to cool a plurality of types of the hot parts among various types of the hot parts.

Other Modified Examples

In the above-described embodiment and modified examples, immediately after the fuel supply to the gas turbine 10 is stopped, the hot-member cooling step (S1) and the first rotor cooling step (S2) are stopped, and at the same time, the second rotor cooling step (S3) is performed. However, when the fuel supply to the gas turbine 10 is stopped, after the hot-member cooling step (S1) and the first rotor cooling step (S2) are accordingly stopped, the second rotor cooling step (S3) may be performed after a time interval.

Further, in the above-described embodiment and modified examples, after the fuel supply to the gas turbine 10 is stopped, if the gas turbine 10 is not started during the necessary cooling period 1, the second rotor cooling step (S3) is continuously performed. However, the second rotor cooling step (S3) may be performed intermittently during the necessary cooling period T. Further, while the fuel supply to the gas turbine 10 is stopped, the second rotor cooling step (S3) may be performed only when a hot-restart is scheduled to be performed.

INDUSTRIAL APPLICABILITY

According to an aspect of the present invention, a tip clearance can be secured at the startup of a gas turbine.

REFERENCE SIGNS LIST

10 Gas turbine
11 Gas turbine rotor
15 Gas turbine casing
16 Intermediate casing (or casing)
20 Compressor
21 Compressor rotor
25 Compressor easing
30 Combustor
31 Fuel supply unit
41 Combustion liner (transition piece or hot part)
43 Cooling air flow channel
46 Cooling air manifold
50 Turbine
51 Turbine rotor
52 Rotor shaft
52p Cooling air flow channel
53 Blade stage
53a Blade
53p Cooling air flow channel
55 Turbine casing
55a Turbine casing main body
55b Ring segment
56 Vane stage
56a Vane
56p Cooling air flow channel
60, 60a, 60b Cooling device
61 Air intake line
62 Filter
68 Air intake control valve (first air intake control valve)
70, 70a, 70b Hot-part cooling system
71, 71b, Hot-part cooling line
76 Cooler A
77 Boost compressor (or simply compressor)
78 Hot-part cooling control valve
80 Rotor cooling system
81 Rotor cooling line
86 Cooler B
87 Inertia filter
88 Rotor cooling control valve
90 Connecting system
91 Connecting line
98 Connection control valve
100 Control device
101 Main control unit
102 Fuel control unit
104 Compressor control unit
105 Valve control unit

The invention claimed is:

1. A cooling device comprising:
a hot-part cooling system including a compressor capable of operating independently of a gas turbine, the hot-part cooling system being configured to extract air inside a casing of the gas turbine from a plenum surrounding a combustor at a first location to pressurize the air with the compressor and guide the air to a hot part that constitutes a part of the gas turbine and is configured to come into contact with combustion gas;

a rotor cooling system configured to extract the air inside the casing of the gas turbine from the plenum surrounding the combustor at a second location and guide the air to a rotor of the gas turbine; and
a connecting system configured to guide the air pressurized by the compressor to the rotor cooling system while a fuel supply to the gas turbine is stopped,
wherein:
the hot-part cooling system includes a hot-part cooling line provided with the compressor and configured to extract the air inside the casing of the gas turbine and guide the air to the hot part of the gas turbine;
the connecting system includes a connecting line connected to the hot-part cooling line at a downstream side of the compressor and configured to guide the air pressurized by the compressor to the rotor cooling system; and
the hot part of the gas turbine comprises at least any one of a combustion liner, a blade, a vane, and ring segments of the gas turbine.

2. The cooling device according to claim 1, wherein the connecting system includes:
a connection control valve in the connecting line; and
a control device configured to close the connection control valve during the fuel supply to the gas turbine and open the connection control valve while the fuel supply to the gas turbine is stopped.

3. The cooling device according to claim 2, wherein:
the hot-part cooling system includes a hot-part cooling control valve in the hot-part cooling line between the connecting line and the hot part of the gas turbine; and
the control device is configured to open the hot-part cooling control valve during the fuel supply to the gas turbine and close the hot-part cooling control valve while the fuel supply to the gas turbine is stopped.

4. The cooling device according to claim 2, wherein the rotor cooling system includes:
a rotor cooling line configured to extract the air inside the casing of the gas turbine and guide the air to the rotor of the gas turbine; and
a rotor cooling control valve in the rotor cooling line, and
wherein:
the connecting line is connected to the rotor cooling line at a downstream side of the rotor cooling control valve; and
the control device is configured to open the rotor cooling control valve during the fuel supply to the gas turbine and close the rotor cooling control valve while the fuel supply to the gas turbine is stopped.

5. The cooling device according to claim 2, wherein:
the control device is configured to cause the compressor to be driven at least temporarily during a necessary cooling period, which starts when the fuel supply to the gas turbine is stopped and ends at a predetermined time, and, when the fuel supply to the gas turbine is not resumed during the necessary cooling period, and the control device is configured to cause the compressor to stop after the necessary cooling period elapses.

6. The cooling device according to claim 2, wherein the hot-part cooling system includes:
an air intake line connected to the hot-part cooling line at an upstream side of the compressor and configured to take in atmospheric air;
a filter configured to remove foreign substances from the atmospheric air in the air intake line; and
an air intake control valve in the air intake line, the air intake control valve being closer to a connection of the air intake line with the hot-part cooling line than the filter,
wherein the control device is configured to close the air intake control valve during the fuel supply to the gas turbine and open the air intake control valve while the fuel supply to the gas turbine is stopped.

7. A gas turbine system comprising:
the cooling device according to claim 1; and
the gas turbine.

8. A method for operating a cooling device including a hot-part cooling system that includes a compressor capable of operating independently of a gas turbine and that is configured to extract air inside a casing of the gas turbine from a plenum surrounding a combustor at a first location to pressurize the air with the compressor and guide the air to a hot part that constitutes a part of the gas turbine and is configured to come into contact with combustion gas, and a rotor cooling system that is configured to extract the air inside the casing of the gas turbine from the plenum surrounding the combustor at a second location and guide the air to a rotor of the gas turbine, the method comprising:
a hot-part cooling step of cooling the hot part of the gas turbine by driving the compressor during a fuel supply to the gas turbine and supplying the air from the hot-part cooling system to the hot part of the gas turbine;
a first rotor cooling step of cooling the rotor by supplying the air from the rotor cooling system to the rotor during the fuel supply to the gas turbine; and
a second rotor cooling step of cooling the rotor by driving the compressor while the fuel supply to the gas turbine is stopped and supplying the air pressurized by the compressor to the rotor via the rotor cooling system,
wherein the hot part of the gas turbine comprises at least any one of a combustion liner, a blade, a vane, and ring segments of the gas turbine.

9. The method according to claim 8, wherein:
in the second rotor cooling step, the air pressurized by the compressor is promoted to flow into the rotor cooling system, and the air pressurized by the compressor is inhibited from flowing into the hot part of the gas turbine.

10. The method according to claim 8, wherein:
in the second rotor cooling step, the air pressurized by the compressor is promoted to flow toward the rotor in the rotor cooling system.

11. The method according to claim 8, wherein:
in the hot-part cooling step, the air pressurized by the compressor is inhibited from flowing into the rotor cooling system, and the air pressurized by the compressor is promoted to flow into the hot part of the gas turbine.

12. The method according to claim 8, wherein:
the second rotor cooling step is performed by driving the compressor at least temporarily during a necessary cooling period, which starts when the fuel supply to the gas turbine is stopped and ends at a predetermined time;
when the fuel supply to the gas turbine is resumed during the necessary cooling period, the hot-part cooling step and the first rotor cooling step are performed after the second rotor cooling step is terminated; and
when the fuel supply to the gas turbine is not resumed during the necessary cooling period, the second rotor cooling step is terminated by stopping the compressor after the necessary cooling period elapses.

13. The method according to claim 8, wherein:
in the second rotor cooling step, atmospheric air is taken into the hot-part cooling system by the compressor and the atmospheric air is supplied to the rotor via the rotor cooling system.

* * * * *